(12) United States Patent
Hemer

(10) Patent No.: US 11,261,037 B2
(45) Date of Patent: Mar. 1, 2022

(54) ADJUSTABLE VACUUM WHEEL

(71) Applicant: Bausch + Ströbel Maschinenfabrik Ilshofen GmbH + Co. KG, Ilshofen (DE)

(72) Inventor: Michael Hemer, Blaufelden (DE)

(73) Assignee: Bausch + Ströbel Maschinenfabrik Ilshofen GmbH + Co. KG, Ilshofen (DE)

( * ) Notice: Subject to any disclaimer, the term of this patent is extended or adjusted under 35 U.S.C. 154(b) by 104 days.

(21) Appl. No.: 16/756,049

(22) PCT Filed: Oct. 15, 2018

(86) PCT No.: PCT/EP2018/078026
§ 371 (c)(1),
(2) Date: Apr. 14, 2020

(87) PCT Pub. No.: WO2019/086233
PCT Pub. Date: May 9, 2019

(65) Prior Publication Data
US 2021/0371211 A1 Dec. 2, 2021

(30) Foreign Application Priority Data
Nov. 2, 2017 (DE) ...................... 10 2017 219 503.7

(51) Int. Cl.
*B65G 47/84* (2006.01)
(52) U.S. Cl.
CPC .... *B65G 47/848* (2013.01); *B65G 2201/0244* (2013.01); *B65G 2207/08* (2013.01)
(58) Field of Classification Search
CPC .................................................. B65G 47/848
(Continued)

(56) References Cited

U.S. PATENT DOCUMENTS

| 3,426,884 | A | * | 2/1969 | Donner | ................ | B65G 47/848 |
| | | | | | | 198/379 |
| 5,058,731 | A | * | 10/1991 | Corniani | .............. | B65G 47/848 |
| | | | | | | 198/867.03 |
| 2008/0230248 | A1 | * | 9/2008 | Niu | ........................... | E21B 1/02 |
| | | | | | | 173/206 |

FOREIGN PATENT DOCUMENTS

DE 102010018216 A1 10/2011
DE 102010027077 A1 1/2012
(Continued)

OTHER PUBLICATIONS

German Application No. DE102017219503.7, "Search Report", dated Jun. 14, 2018, 9 pages.
(Continued)

*Primary Examiner* — Gene O Crawford
*Assistant Examiner* — Lester Rushin, III
(74) *Attorney, Agent, or Firm* — Kilpatrick Townsend & Stockton LLP

(57) ABSTRACT

The present invention relates to a transport wheel arrangement for handling cylindrical bodies, comprising a base body (104), a negative pressure source which is intended to provide a negative pressure for holding the cylindrical bodies, a disc-shaped wheel body (102) which is rotatably mounted about its central axis (R1) on the base body (104), a drive device which is designed to set the wheel body (102) in rotary motion, at least one receiving assembly (112) for holding a cylindrical body, comprising a shaft (114) which receives a line (120) for conducting the negative pressure, a contact member (116) provided radially outside the shaft (114) which is designed to present a contact surface for a held cylindrical body, and a suction cup member (116) which is connected to the line (120) for conducting the negative pressure and is designed to hold a cylindrical body by means of this negative pressure; and a control unit which is designed to control the operation of the drive device and, if necessary, the vacuum source, wherein the transport wheel arrangement further comprises a displacement apparatus (122) which is designed to displace the contact element (116) and the suction cup element (118) of the receiving assembly (112) or at least one of the plurality of receiving assemblies (112) in a coordinated manner with respect to the wheel body (102).

18 Claims, 5 Drawing Sheets

(58) Field of Classification Search
USPC .................................................. 198/348, 385
See application file for complete search history.

(56) References Cited

FOREIGN PATENT DOCUMENTS

| | | |
|---|---|---|
| DE | 102011007428 A1 | 10/2012 |
| DE | 102011081754 A1 | 2/2013 |
| EP | 0355971 A2 | 2/1990 |
| EP | 0401698 B1 | 8/1994 |
| EP | 1413366 A1 | 4/2004 |
| EP | 2093169 A1 | 8/2009 |
| EP | 2604553 A1 | 6/2013 |
| EP | 3023366 A1 | 5/2016 |
| EP | 3239078 A1 | 11/2017 |
| JP | 06183553 A | 7/1994 |

OTHER PUBLICATIONS

International Application No. PCT/EP2018/078026, "International Search Report and Written Opinion", dated Feb. 4, 2019, 14 pages.

\* cited by examiner

ADJUSTABLE VACUUM WHEEL

CROSS REFERENCE TO RELATED APPLICATION

This application claims priority to German Patent Application No. 10 2017 219 503.7, filed in Germany on Nov. 2, 2017, the entire contents of which are hereby incorporated herein by this reference.

The present invention relates to a transport wheel arrangement for handling cylindrical bodies, in particular bottles and/or ampoules, comprising a base body, a negative pressure source which is Intended to provide a negative pressure for holding the cylindrical bodies, a disc-shaped wheel body which is mounted on the base body so as to be rotatable about its central axis and which has at least one aperture in its peripheral edge, a drive device which is adapted to set the wheel body in rotary motion, at least one receiving assembly for holding a cylindrical body, comprising a shaft, which extends radially outwardly through the aperture or one of the apertures in the peripheral edge and which receives a line for conducting the negative pressure, a contact element provided radially outwardly on the shaft which is designed to present a contact surface for a held cylindrical body, and a suction cup element which is connected to the line for conducting the negative pressure and is designed to hold a cylindrical body by means of this negative pressure, and a control unit which is designed to control the operation of the drive device and optionally the negative pressure shaft.

Such transport wheel arrangements are used in many different applications, for example in the chemical or pharmaceutical industry, where cylindrical bodies such as bottles are transported and handled. Here, such transport wheel arrangements can act either as components of superordinate systems, such as filling systems, or also as switches in which the cylindrical bodies can be supplied to different exit paths. In particular, assemblies are known in which at least two such transport wheel arrangements are arranged in sequence and the cylindrical bodies are therefore first received by one of the transport wheel arrangements and either transferred to the second transport wheel arrangement at a transfer point or discharged from the first transport wheel arrangement at another point.

In such transport wheel arrangements, well-known assemblies are used, in particular the aforementioned negative pressure sources and suction cup elements, which are used together to suck the cylindrical bodies towards the wheel body, so that they then come to the contact with the contact elements in addition to the planar system with the suction cup elements. For this purpose, the transport wheel arrangements known from the state, of the art comprise pocket-shaped contact elements, which are each arranged at the peripheral edge of the wheel body and are adapted to a diameter of the cylindrical bodies to be transported.

However, these known transport wheel arrangements are not suitable for transporting cylindrical bodies with different diameters, or they at least require a time-consuming manual adjustment process if the diameters of cylindrical bodies to be transported are to change, as this requires a number of adjustment steps, especially in the case of a plurality of receiving assemblies per transport wheel arrangement, which then have to be individually adapted to the changed diameter of the cylindrical bodies. As a result, known transport wheel arrangements have an increased service life when the diameter of the cylindrical bodies to be handled changes, whereby both the efficiency and flexibility of such arrangements suffer.

It is therefore the task of the present invention to further develop a known transport wheel arrangement in such a way that it permits safe and reliable transport of cylindrical bodies of different diameters, thereby increasing the flexibility of such an arrangement and its handling performance, while no disadvantages are encountered in its transport operation.

For this purpose, the transport wheel arrangement according to the invention further comprises a displacement apparatus which is designed to radially displace the contact element and the suction cup element of the receiving assembly or at least one of the plurality of receiving assemblies in a coordinated manner with respect to the wheel body. By providing this displacement apparatus assigned to the transport wheel arrangement itself, an automatic adjustment of the transport wheel arrangement according to the invention is also possible on cylindrical bodies with different diameters in the shortest time or even during operation, so that this adaptation requires practically no more standstill of the transport wheel arrangement according to the invention. By a coordinated displacement of the at least one contact element and the at least one suction cup element by means of the displacement apparatus, a reception or transfer of the cylindrical bodies with different diameters can also be ensured by the transport wheel arrangement at reception and discharge points of a superordinate structure.

In a case in which a plurality of receiving assemblies are provided on the transport wheel arrangement according to the invention, the displacement apparatus can also be designed to synchronously displace the contact elements and suction cup elements of a plurality of, in particular all receiving assemblies.

In a preferred embodiment, the at least one contact element of the transport wheel arrangement according to the invention may further comprise two limbs which extend obliquely radially outwards from the shaft with respect to it. Such an embodiment of the at least one contact element is more suitable for cylindrical bodies of different diameters than would be the case, for example, with contact elements in the form of a circular portion. Such radially obliquely outwardly protruding limbs always provide two tangential contact points or lines for cylindrical bodies with diameters that may extend over a wide range, so that the force acting on the cylindrical body through the suction cup element acts symmetrically towards the shall and, together with the suction cup element, can ensure a secure hold of the cylindrical body.

For this purpose, it may also be advantageous if the at least one suction cup element is arranged in radial extension of the shaft between the two limbs of the corresponding contact element. Naturally, however, also other arrangements of the suction cup element are possible, e.g. this element could be shifted along the apex formed between both limbs.

In order to conduct the displacement of the at least one contact element and the at least one suction cup element relative to the wheel body brought about by the displacement apparatus, the at least one receiving assembly can comprise at least one cam which is guided in an elongated hole associated with the disc-shaped wheel body.

Although it is naturally conceivable to form the displacement apparatus, for example, by means of a majority of actuators which individually displace the individual contact elements and suction cup elements and which are coordinated by means of a common control system, it may be advantageous, in order to reduce the structural effort, if the displacement apparatus makes use of mechanical actuating means in order to reduce the number of electronic components used.

In a particularly simple embodiment, the disc-shaped wheel body may comprise two concentrically arranged disc elements which are rotatable relative to one another with respect to their common central axis, for example if the drive device comprises respective drives, in particular servomotors, for both disc elements. In this embodiment, if the elongated hole, in which the at least one cam associated with a receiving assembly is received, extends spirally over a predetermined angular range of the wheel body, the twisting of the two disc elements relative to each other can cause the displacement of the contact element and the suction cup element in the radial direction relative to the wheel body.

Since a different diameter of various cylindrical bodies results in a likewise different curvature of the outer wall of the cylindrical body in the region where the cylindrical body contacts the contact element and the suction cup element holds the cylindrical body, it can be advantageous for the secure holding of the body if the displacement apparatus, is designed to displace the at least one contact element and the at least one suction cup element also relative to each other during radial displacement with respect to the wheel body.

Alternatively, however, it could be considered to form the at least one contact element and the at least one suction cup element as a fixed assembly, so that these elements cannot be moved relative to each other, but always carry out their displacement together relative to the wheel body. Such a simplified embodiment can be particularly advantageous it the displacement range of these assemblies is rather small in terms of amount compared to the wheel body, so that a relative displacement of the contact, elements and the suction cup elements with respect to each other is not considered necessary.

In particular, in the above-mentioned case of two radially obliquely outwardly protruding limbs and the associated tangential contact of the cylindrical body at two points or tines on these limbs, a further protrusion of the suction cup element between the two limbs may be desirable at a lower curvature of the cylindrical wall of the body.

In the example of guiding cams in elongated holes, also mentioned above, the relative radial displacement of the contact element and the suction cup element can be achieved in that a separate cam is assigned to each of the contact element and the suction cup element, which cams are guided in separate elongated holes in one of the two disc elements, the elongated holes being formed in such a way that twisting of the two disc elements relative to each other causes a relative displacement of the contact element and the suction cup element in the radial direction. In the case of the spirally running elongated hates mentioned above, it must therefore be ensured that the spirals do not run completely parallel to each other, but move away from each other in one direction, whereby a radial moving apart of the suction cup element and the contact element is caused when the cams assigned to them each run in these two elongated holes.

For this purpose, the shaft may, in particular, comprise two shaft elements arranged concentrically and slidable against each other in the axial direction of the wheel body, one of which accordingly carries the contact element and the other carries the suction cup element. In this way it can be ensured that even with the described relative displacement in the radial direction between the suction cup element and the contact element, the stability of the receiving assembly in the peripheral direction of the wheel body is maintained.

In order to permit the delivery of the cylindrical bodies from the transport wheel arrangement according to the invention to another component of a superordinate structure at a predetermined transfer point, at least one switching device can be associated with the base body, which device is operable to interrupt the supply of negative pressure to the base body at a predetermined relative angle between the base body and the suction cup element or one of the plurality of suction cup elements. Here the switching device can be set up in such a way, that the supply of the negative pressure takes place at the predetermined relative angle at any time, or also in such a way that the switching device only selectively prevents the supply of the negative pressure. As an alternative to such a switching device, it could also be thought, for example, that the apparatus which takes over the cylindrical bodies at the transfer point could also, for example, use suction cup elements, which, however, are operated with a greater negative pressure, so that the pressure difference causes the cylindrical bodies to be pulled off the transport wheel arrangement and transported further by the other component.

Since the transport wheel arrangement according to the invention can be used especially in the chemical industry and the pharmaceutical industry, where the cylindrical bodies are often bottles with a diameter of 4 to 9 cm, it can be considered that the displacement apparatus should be set up to allow a radial displacement of the contact element relative to the wheel body by at least 20 mm, preferably at least 45 mm. It should also be noted in this context that for a cylindrical body with a diameter increased by 45 mm, a displacement of the contact element in relation to the wheel body by only half, i.e. 20 mm, is necessary so that the axis of the cylindrical body runs at the same position in relation to the wheel body as for a cylindrical body with a diameter reduced by 45 mm, wherein this axis is usually the decisive parameter during the transport or the acceptance and transfer of cylindrical bodies.

In order to reduce the maintenance effort of the transport wheel arrangement according to the invention and to make it suitable to meet the requirements for use in the pharmaceutical industry in particular, the at least one shaft can be led out of the disc-shaped wheel body in a sealed manner and, if necessary, further sealing elements can be provided so that the interior of the wheel body is sealed against the environment. In this way it can be ensured that, for example, lubricant provided in the interior of the wheel body is hermetically kept away from the substances received in the cylindrical bodies.

To further increase the flexibility of the transport wheel arrangement according to the invention with respect to the shaping of the cylindrical bodies to be transported, it can further comprise a height adjustment device which is adapted to move the wheel body towards its central axis. When transporting cylindrical bodies, this allows the holding point of the suction element on the cylindrical body and the contact points on the contact surface along the axis of the cylindrical body to be adjusted.

Since, as already mentioned, a transport wheel arrangement according to the invention can be used in particular as a component of a superordinate structure, according to a further aspect the present invention relates to a lock arrangement for cylindrical bodies, in particular bottles and/or ampoules, comprising at least a first and a second transport wheel arrangement according to the invention, which are arranged in such a way that the cylindrical bodies can be transferred from the first transport wheel arrangement to the second transport wheel arrangement at a transfer point, at least one input device which is provided for this purpose, to transfer the cylindrical bodies to the first transport wheel arrangement at an input point, at least a first and a second output device each designed to receive and transport away the cylindrical bodies from the first or second transport wheel arrangement at an output point, wherein the control units of the first and second transport wheel arrangements are operatively coupled together or are formed by a single common control unit, and wherein the lock arrangement is selectively operable such that the cylindrical bodies are received by the first or the second output device.

Further features and advantages of the present invention become clear from the following description of an exemplary embodiment when considered together with the enclosed figures. These show in detail:

Figure 1:
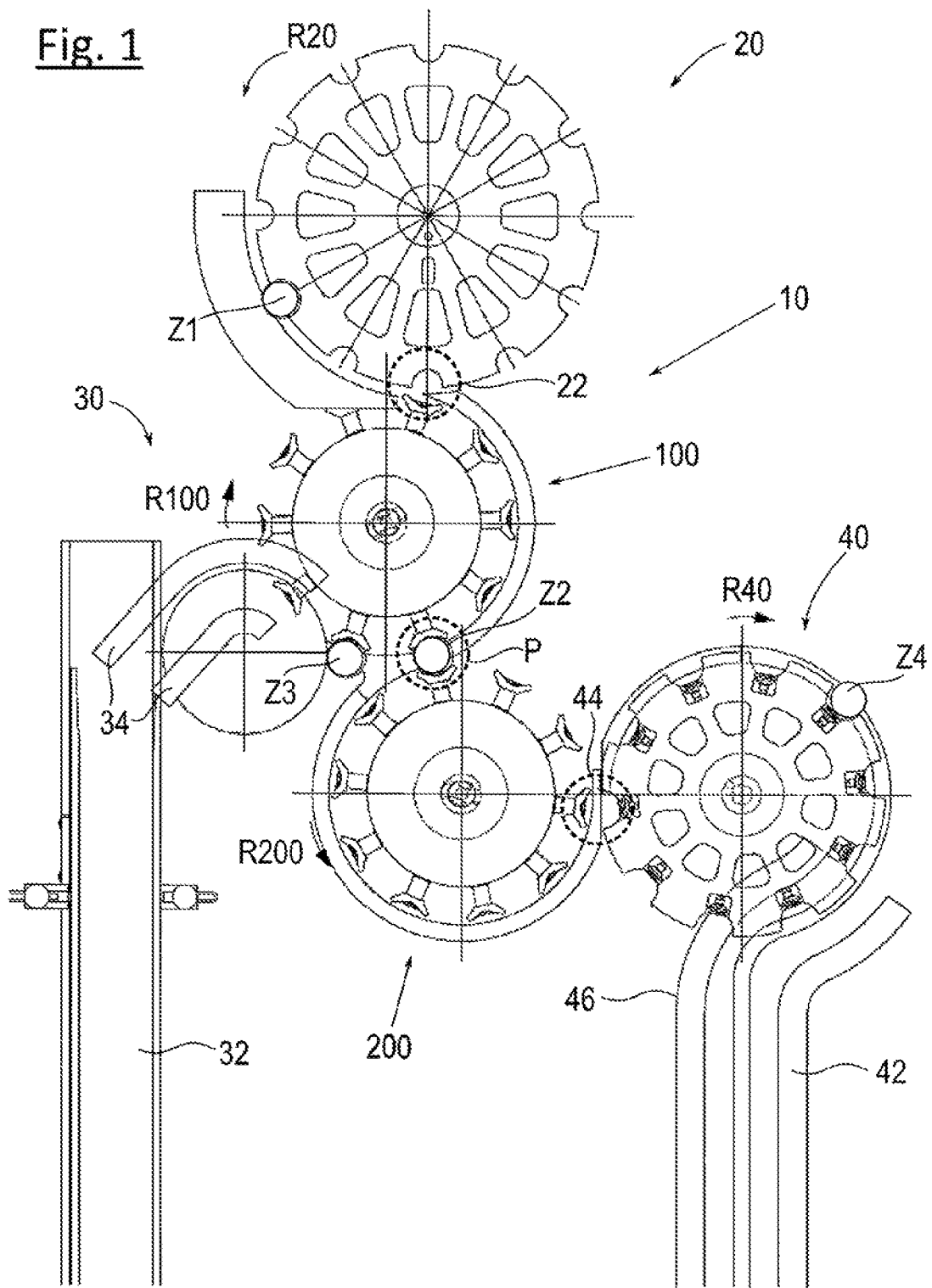
FIG. 1 shows a lock arrangement according to the invention for cylindrical bodies in a plan view.

FIG. 1 shows a lock arrangement according to the invention for cylindrical bodies, in particular for bottles and/or ampoules, generally designated by the reference sign 10. The lock arrangement 10 comprises an, input device 20 formed as a transport wheel, which is intended to transfer the cylindrical bodies at an input point 22 to a first transport wheel arrangement 100 according to the invention, as well as a first output device 30, a second output device 40 and a second transport wheel arrangement 200 according to the invention.

The lock arrangement 10 is intended to transfer cylindrical bodies optionally to the first output device 30 or the second output device 40, from which they can then be further transported via respective first and second transport devices 32 and 42 and fed accordingly to further components of a superordinate system. The first and the second output device 30 and 40 are constructed differently, since the first output device in fact comprises only a two-part linear guide 34, on which cylindrical bodies guided by the first transport wheel arrangement 100 are stripped off and are moved on to the first transport device 32 by the pressure of subsequent cylindrical bodies, by which device they are then transported away as mentioned.

Contrary to this, the second output device 40 also comprises a transport wheel, the axis of rotation of which is parallel to those of the input device 20 and the two transport wheel arrangements 100 and 200. The second output device 40 takes over the cylindrical bodies at a transfer point 44 from the second transport wheel arrangement 200, which bodies after further rotation of the second output device 40 are then also stripped off at a linear guide 46, which forms a part of the second transport device 42, and are transported further away.

The directions of rotation of the transport wheels 20, 46, 100 and 200 during operation of the lock arrangement 10 are indicated respectively in FIG. 1 by arrows R20, R40, R100 and R200.

The decision as to whether a cylindrical body fed into the lock arrangement 10 via the input device 20 is ultimately transported away by the first transport device 32 or the second transport device 42 is made at the transfer point P between the first transport wheel arrangement 100 and the second transport wheel arrangement 200. In the case where a transfer of the cylindrical body from the first transport wheel arrangement 100 to the second transport wheel arrangement 200 takes place, the cylindrical body is finally discharged from the lock arrangement 10 by the second transport device 42, whereas if at the point P a transfer of the cylindrical body from the first transport wheel arrangement 100 to the second transport wheel arrangement 200 is waived, the cylindrical body is finally discharged from the lock arrangement 10 by the second transport device 32.

It can be seen the plan view from FIG. 1 that, particularly at the transfer points 22, 44 and P, the elements supporting the cylindrical bodies, which elements are described in detail below for the first and second transport arrangements, must be aligned to each other in a relative position corresponding to the outer diameters of the cylindrical bodies. If this relative distance is too large, a trouble-free transfer of the cylindrical body could not be ensured, and the cylindrical bodies could be damaged at the transfer points if the elements were too close to each other.

It is also evident that the rotational speeds of the rotating elements 20, 40, 100 and 200 matched to each other, so that the elements carrying the cylindrical body are present in pairs at the same time at the transfer points 22, 44 and P as this is also an essential prerequisite for a trouble-free transfer of the cylindrical bodies.

It is further important to note a plurality of the above-mentioned cylindrical bodies are shown in FIG. 1, which are currently located at different positions in the lock arrangement 10, and which are marked with the, reference signs Z1 to Z4. Here the cylindrical body Z1 is currently supported by the transfer device 20 and will soon be transferred from it to the first transport wheel arrangement 100. The second cylindrical body Z2 is currently located at the transfer point P and is just being transferred from the first transport wheel arrangement 100 to the second transport wheel arrangement 200. The third cylindrical body Z3, on the other hand, has not been transferred to the second transport wheel arrangement 200, but has remained with the first transport wheel arrangement 100, i.e. it has passed through point P without having been delivered by the first transport wheel arrangement 100, so that it will soon be transferred to the first output device 30 and finally be discharged from the lock arrangement 10 by the first transport device 32. The fourth cylindrical body Z4 has again been taken over by the second transport wheel arrangement 200 at the transfer point P and then transferred to the second output device 40 at the transfer point 44, so that it is now located on the second output device 40 and will finally be discharged from the lock arrangement 10 by the second transport device 42.

Figure 2:
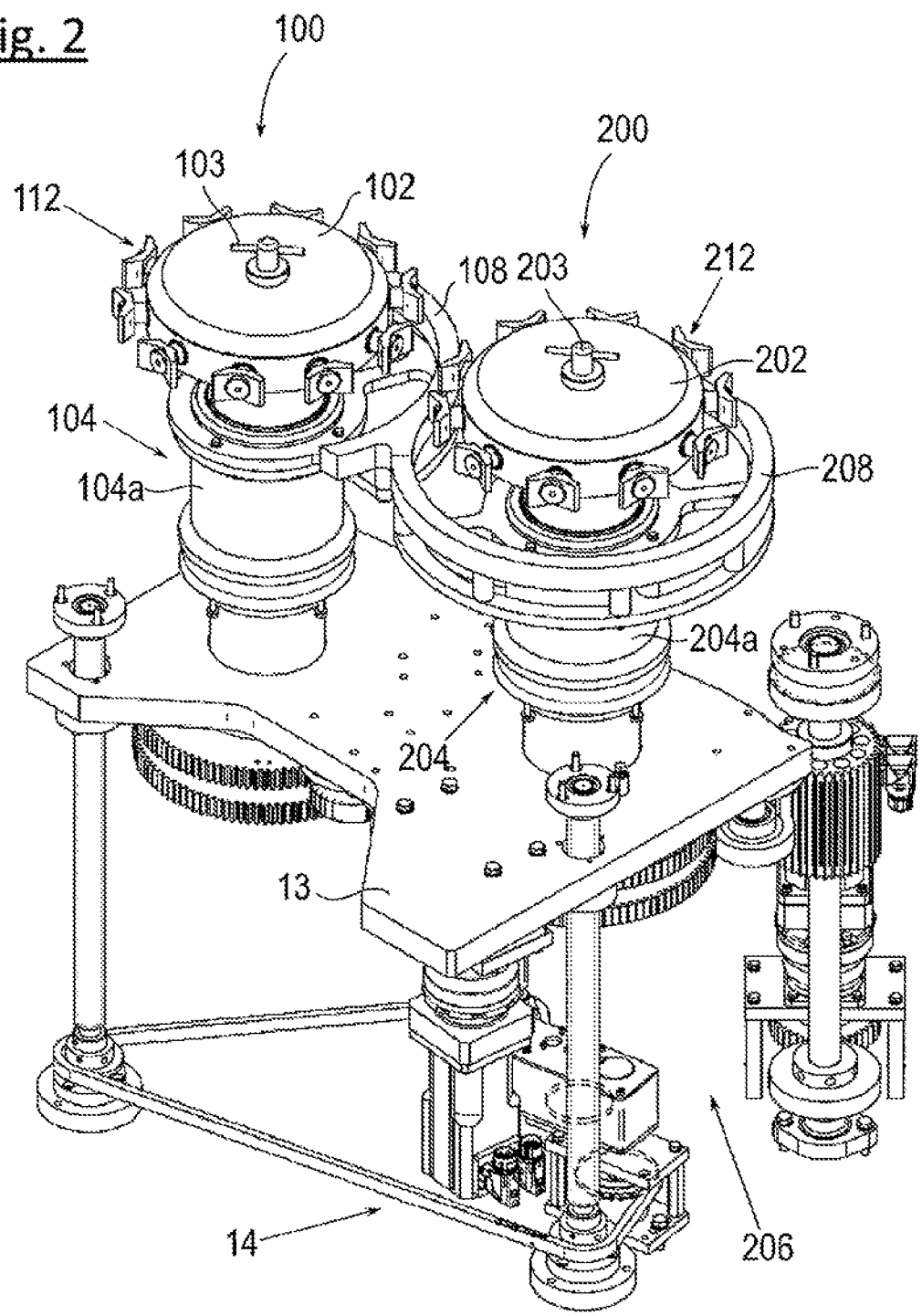
FIG. 2 shows a lateral oblique view of the two transport wheel arrangements from FIG. 1.

FIG. 2 now shows the first and second transport wheel arrangement 100 and 200 in oblique plan view. These transport wheel arrangements 100 and 200 comprise respective multi-part disc-shaped wheel bodies 102 and 202, the exact construction of which will be shown in the following figures and which are held together by wing nuts 103 and 203. The wheel bodies 102 and 202 are further rotatably arranged relative to respective base bodies 104 and 204, of which respective first or outer parts 104*a* and 204*a* are visible in FIG. 2. The two outer parts 104*a* and 204*a* of the base bodies 104 and 204 are attached to a first common base plate 12 shown only in FIG. 3. Within the outer parts 104*a* and 204a, the base bodies 104 and 204 comprise displaceable inner or second parts (in the case of the inner part 104b of the first transport wheel arrangement 100 also visible only in FIG. 3), which in turn are connected to a second common base plate 13 which is height-adjustable by means of a height adjustment device 14. In this way, not only can the adaptation of the respective transport wheel arrangement 100 and 200 described below be carried out to the outer diameter of the cylindrical bodies to be handled, but also an adaptation to the height or the most suitable receiving point of the cylindrical bodies.

Furthermore, a drive device 206 is shown in FIG. 2, which can cause the rotational movement of the disc-shaped wheel body 202 of the second transport wheel arrangement 200. Although not shown in FIG. 2 for perspective reasons, the first transport wheel arrangement 100 is also associated with a corresponding drive device 106, which is, for example, partly shown in FIG. 3. The individual drive devices 106 and 206 have to be operated in a coordinated manner, as already mentioned, so that the transfers of cylindrical bodies at the transfer points described above can proceed smoothly. For this purpose the drive devices 106 and 206 of the first and second transport wheel arrangements 100 and 200 can be controlled by a common control unit which is not shown, or respective control units can be associated with the first and second transport wheel arrangements 100 and 200 but are in a data exchange for their synchronisation.

In addition, FIG. 2 also shows guide elements 108 and 208 which are attached to the respective outer parts 104a and 204a of the base bodies 104 and 204 of the first and second transport wheel arrangements 100 and 200 and act as supports for the cylindrical bodies so that the bodies carried by the transport wheel arrangements 100 and 200 can stand on them while they travel along the intended circular paths.

Figure 3:
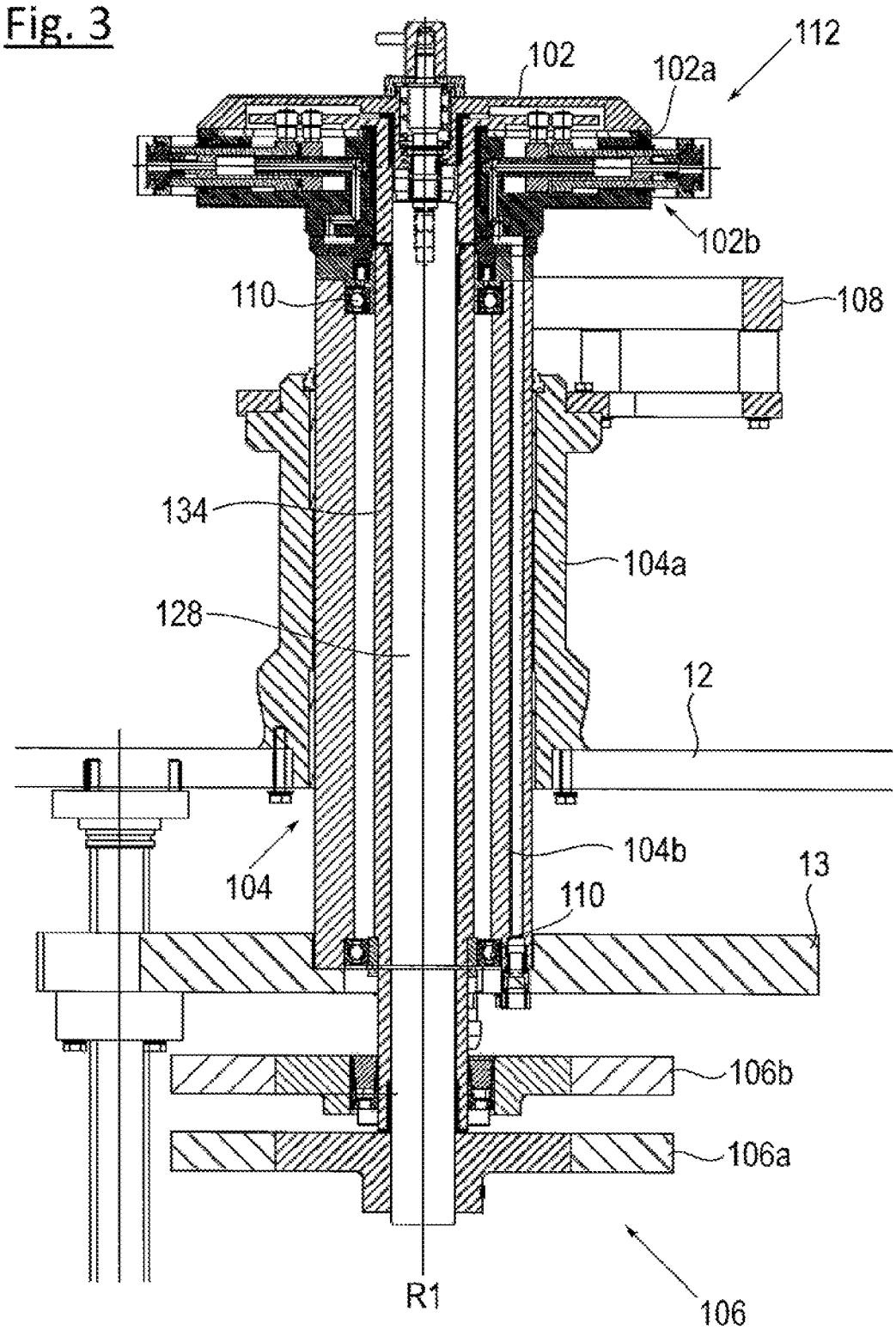
FIG. 3 shows a cross-sectional view of one of the transport wheel arrangements from FIGS. 1 and 2.

In FIG. 3, an exemplary first transport wheel arrangement 100 is now shown in a cross-section running through its axis of rotation, which is marked R1 in the view shown in FIG. 3. Furthermore, in FIG. 3 several components can be recognised which have already been described in connection with FIG. 2, such as the first base plate 12 and the base body 104. It can now be seen that the main body 104 is formed in two parts and, within its outer part 104a, which is mounted on the first base plate 12, still includes the second part 104b, which is firmly connected to the second base plate 13 and carries the wheel body 102.

In addition, FIG. 3 also shows components of the drive unit 106 that can set the wheel body 102 in rotation, namely a first gear 106a and a second gear 106b, the function of which will be discussed below. There is also a plurality of pairs of bearings 110 intended to enable the rotation of the wheel body 102 with respect to the second part 104b of the main body 104, the rotation being about the axis of rotation R1 and driven by the drive device 106. Here, the first gear 106a is connected to a first spindle 128, which is accommodated within a second spindle 134, which in turn is connected to the second gear 106b.

The disc-shaped wheel body 102 comprises multiple apertures 102b in its peripheral edge 102a, through which respective receiving assemblies 112 extend radially outwards. These receiving assemblies 112 are also already shown in FIG. 2, as are the corresponding receiving assemblies 212 of the second transport wheel arrangement 200. It can also be seen there that the two transport wheel arrangements 100 and 200 are each respectively associated with ten receiving assemblies 112 or 212, which are distributed at even angular distances around the wheel bodies 102 and 202 and are identically constructed, so that the following description of a single receiving assembly 112 can be transferred completely to all the receiving assemblies 112 and 212 of the two transport wheel arrangements 100 and 200.

Figure 4:
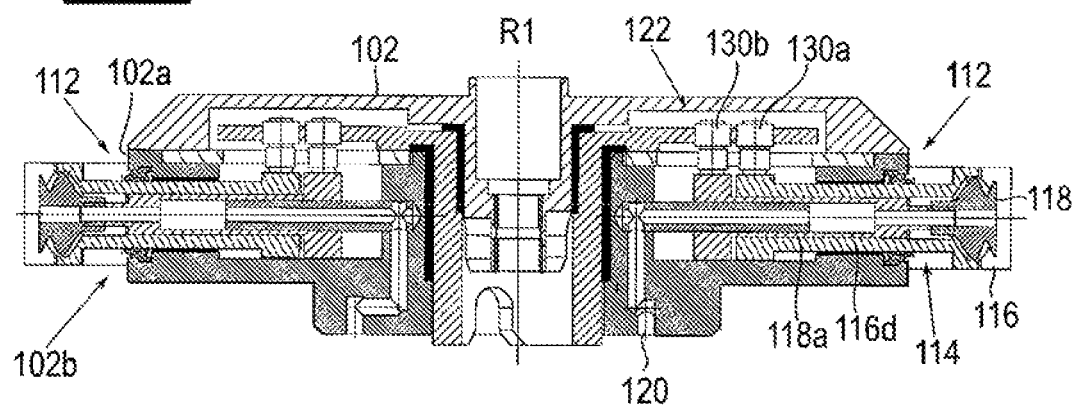
FIG. 4 shows an enlarged illustration of a section from FIG. 3.

For an understanding of the function of the transport wheel arrangement 100, reference is made FIG. 4, in which the disc-shaped wheel body 102 together with two radially opposite mounting assemblies 112 and other components are shown again in an enlarged view.

Each receiving assembly 112 comprises a cylindrical shaft 114 which extends radially outwards through the aforementioned aperture 102b in the peripheral edge 102a in the disc-shaped wheel body 102. At the radially outer end of the shaft 114, a contact element 116 is provided, which comprises two limbs 116a and 116b extending radially obliquely outwards in relation to the shaft (see FIGS. 6a to 6c). This contact element 116 with its limbs 116a and 116b can also be seen in the plan view from FIG. 1, which shows that the limbs 116a and 116b form respective contact surfaces for the cylindrical bodies that are supported by the corresponding receiving assembly, for example the cylindrical bodies Z2 and Z3 shown in FIG. 1.

A radially outwardly pointing suction cup element 118 is also provided between the two limbs 116a and 116b, and is supplied via a line 120 with a negative pressure generated by a negative pressure source (not shown), wherein the line 120 first runs parallel to the axis of rotation R1 from below and then bends in a radial direction to run through the interior of the shaft 114 to the suction cup element 118. The said suction cup element 118 is formed of an elastic material, such as a suitable rubber material, and is designed to adapt to the cylindrical outer contour of the cylindrical bodies by means of the negative pressure supplied through the line 120 and to hold them in place by the action of the negative pressure.

In order to enable the displacement of the bearing element 116 and the suction cup element 118 in relation to the wheel body 102 in the axial direction according to the invention, a displacement apparatus 122 is also provided, which will be explained in more detail below with reference to FIGS. 6a to 6c. In the shown embodiment, the displacement apparatus 122 is capable of displacing the contact element 116 and the suction cup element 118 radially with respect to the wheel body in a coordinated manner such that a relative movement between the contact element 116 and the suction cup element 118 also occurs.

Figure 5:
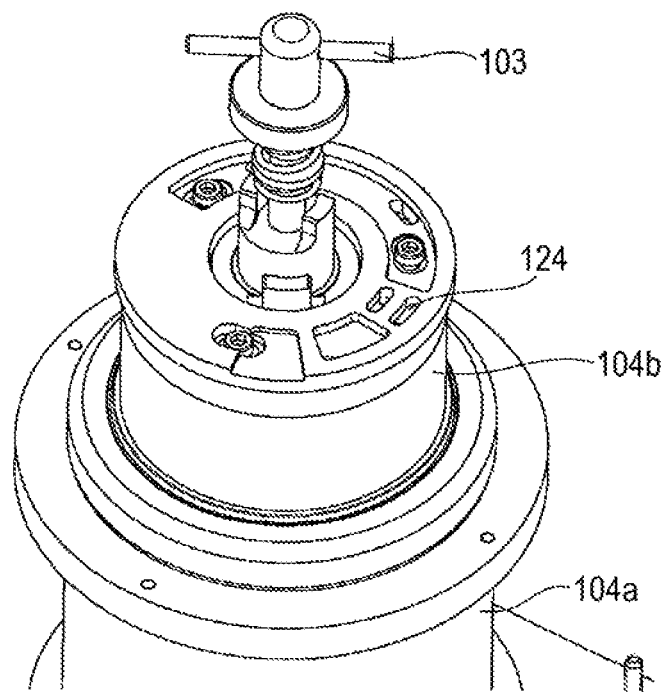
FIG. 5 shows a detailed view of the base body of one of the transport wheel arrangements from FIGS. 1 and 2 in an oblique plan view.

First, however, with reference to FIG. 5, which shows sections of both parts 104a and 104b of the basic body 104 in an oblique plan view, the transfer process that takes place at the transfer points 22, 44 and P from FIG. 1 is explained.

As already mentioned several times, the parts 104a and 104b of the basic body 104 are firmly arranged in relation to the base plates 12 and 13, so that these always remain in a firm spatial orientation, while the disc-shaped wheel body 102, which is not shown in FIG. 5 for reasons of clarity, rotates about an axis of rotation in relation to this basic body 104, In order to allow transfer of the cylindrical body carried by the said receiving assembly 112 at predetermined angular positions of the receiving assemblies 112 relative to the base body 104, for example at the said transfer points 22, 44 and P, the base body 104 is associated with a switching device 124 in the representation in FIG. 5 which, when swept by the receiving assembly 112 by the rotation of the wheel body 102, can selectively interrupt the supply of negative pressure through the line 120 to the suction cup element 118.

The switching device 124 shown in FIG. 5 is only one embodiment of this, because depending on the application at the corresponding transfer point, either permanently set switching devices can be provided, which always suppress the supply of negative pressure at the respective position, or switching devices whose functionality can be switched on and off, so that it is either possible to disconnect the currently earned cylindrical body or not.

Again with reference to FIG. 1, for example, the second transport wheel arrangement 200 can thus comprise a permanently set switching device assigned to the transfer point 44, since at this point obviously every cylindrical body is to be transferred to the second output device 40 and no cylindrical body is to remain at the second transport wheel arrangement 200.

In contrast, the first transport wheel arrangement 100 in FIG. 1 may include a variable switching device which makes it possible, at the transfer point P, to selectively interrupt the delivery of the negative pressure to a receiving assembly reaching that point P in order to selectively permit or prevent the transfer of a cylindrical body to the second transport wheel arrangement 200 at that point P. Thus the lock effect of the lock arrangement 10 from FIG. 1 can be controlled by a single switching device associated with the first transport wheel arrangement 100. Alternatively, however, other mechanisms for the selective discharging of the cylindrical bodies would also be conceivable, for example, the second transport wheel arrangement 200 could operate with a higher negative pressure in terms of amount, which is then selectively switched on and off in the range of the transfer point P, wherein the second transport wheel arrangement 200 can thus selectively forcibly take over the cylindrical bodies at this point P.

Figure 6A:
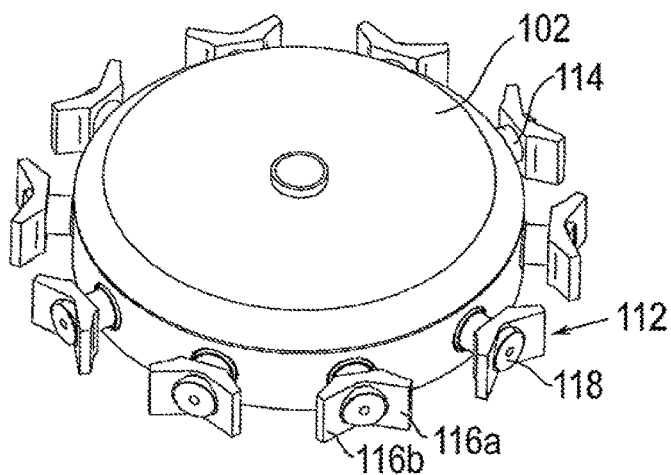
FIGS. 6*a* to 6*c* show three views of one of the transport wheel arrangements from FIGS. 1 and 2, each in a partially disassembled state.
Figure 6B:
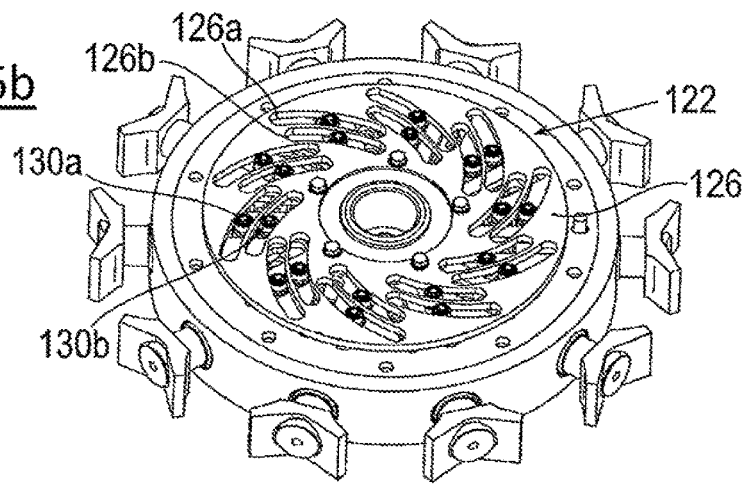
Figure 6C:
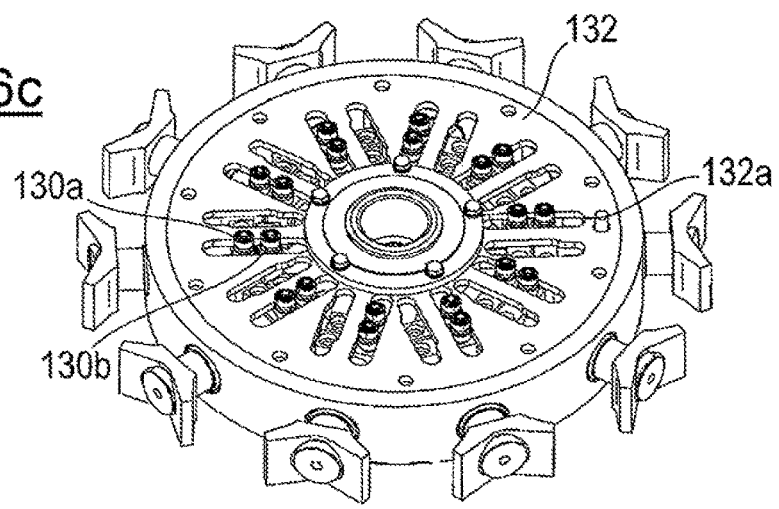

Finally, with reference to FIGS. 6a to 6c, the function of the displacement apparatus 122 is explained, by means of which, in the shown embodiment of a transport wheel arrangement 100, the contact elements 116 and suction cup elements 118 can be displaced in a coordinated manner radially outwards in relation to the disc-shaped wheel body 102 on the one hand and are also displaced relative to one another during this displacement.

For this purpose, the wheel body 102 of the first transport wheel arrangement 100 is shown again in FIG. 6a in a view which essentially corresponds to that in FIG. 2. Here, only the wing nut 103 was omitted, so that in FIG. 6a only the top of the wheel body 102 and the ten receiving assemblies 112, each with their contact elements 116, each comprising wings 116a and 116b, suction cup elements 118 and the portions of their shafts 114 protruding from the wheel body 102 are shown.

In FIG. 6b the upper cover of the disc-shaped wheel body 102 has now been removed, so that there is a clear view of the displacement apparatus 122 and in particular of its first disc 126 is clear. As can be seen in FIG. 3, this first disc 126 is connected to the second gear 106b of the drive device 106 via the already mentioned shaft 134, so that it is set in rotation by a rotation of this gear 106b. Further, the first disc has 126 pairs of elongated holes 126a and 126b running spirally counterclockwise from inside to outside, in which respective cams 130a and 130b are guided. As can be best seen in FIG. 4, these cams 130a and 130b are connected to the contact element 116 or the suction cup element 118 by means of spindles 116d or 118a carrying the contact element 116 or the suction cup element 118. These spindles 116d and 118a are slidably arranged against each other so that a displacement of the contact element 116 in elation to the suction cup element 118 is possible, and they each form part of the shaft 114.

Again with reference to FIG. 6b, it can be seen that the pairs of elongated holes 126a and 126b are not completely parallel to each other, but slightly diverge from each other in the radially outward direction. Accordingly, when the cams 130a and 130b are guided radially outwards in the elongated holes 126a and 126b, the spindles 116d and 118a will also move slightly away from each other, which will ultimately result in a relative displacement of the contact elements 116 in relation to the suction cup elements 118, which will take place simultaneously with the radial displacement of the contact elements 116 and the suction cup elements 118 in relation to the wheel body 102.

Finally, in FIG. 6c, the first disc 126 of the displacement apparatus 122 has been removed for illustration purposes, so that the view of the second disc 132 of the displacement apparatus 122 is clear. This second disc 132 is firmly connected to the wheel body 102 and can therefore also be set into a rotational movement by a rotary motion of the second gear 106a of the drive apparatus 106. The second disc 132 also has elongated holes 132a oriented in the radial direction, in which the already mentioned cams 130a and 130b of the contact elements 116 and suction cup elements 118 are also guided.

The functioning of the displacement apparatus 122 can now be understood in an overview of FIGS. 6b and 6c, assuming that the two discs 126 and 132 can be rotated against each other, This is achieved by separate stepper motors each driving the gears 106a and 106b of the drive apparatus 106, wherein these two stepper motors are controlled in a coordinated manner. In normal operation, the two motors run completely synchronously, so there will be no relative displacement in the angular direction between the first disc 126 and the second disc 132. However, if the contact elements 116 and the suction cup elements 118 are now to be moved radially in relation to the wheel body 102 in order to be prepared for use with cylindrical bodies of a different diameter, the stepper motors which drive the gears 106a and 106b will be operated asynchronously for a short time, so that a relative rotation between the two discs 126 and 132 will occur. As a result, the cams 130a and 130b, which are guided in the two elongated holes 132a and 126a and 126b respectively, are displaced radially outwards or inwards, wherein the slight displacement between the cams 130a and 130b and thus the contact element 116 and the suction cup element 118 mentioned above is achieved by the slightly different curvature of the two elongated holes 130a and 130b.

In this way, for cylindrical bodies with a range of diameters determined by the geometry of the elongated holes 126a and 126b and the diameter of the wheel body 102 and thus the maximum possible displacement of the contact elements 116 and the suction cup elements 118, optimum contact and optimum holding by the suction cup elements 118 can be achieved.

Only for the sake of completeness it should be pointed out that also embodiments of the present invention would be conceivable in which the contact elements and suction cup elements as well as the spindles carrying these elements together with the cams associated with them form a fixed assembly, so that no more relative movement between the contact elements and the suction cup elements can be provided. In this case, only a single curved elongated hole can be used together with a single cam per such assembly.

The invention claimed is:

1. Transport wheel arrangement for handling cylindrical bodies comprising:
   a main body;
   a negative-pressure source, which is provided to produce a negative pressure for holding the cylindrical bodies;
   a disc-shaped wheel body, which is mounted on the main body for rotation about an central axis of the disc-shaped wheel body, and which has at least one opening in a peripheral edge of the disc-shaped wheel body;
   a drive apparatus, which is configured to set the wheel body into a rotational movement;
   at least one receiving assembly for holding a cylindrical body, comprising:
      a shaft, which extends radially outwards through an opening of the at least one opening in the peripheral edge and which receives a line for guiding the negative pressure;
      a contact element provided radially on an outside of the shaft as a contact surface for a held cylindrical body; and
      a suction cup element, which is connected to the line for guiding the negative pressure and is configured to hold a cylindrical body via the negative pressure;
   a control unit, which is designed to control the operation of the drive apparatus; and
   a displacement device, which is configured to radially displace the contact element and the suction cup element of a receiving assembly in a coordinated manner with respect to the wheel body, wherein the displacement device is further configured to displace the contact element and the suction cup element relative to one another in an event of radial displacement with respect to the wheel body, and in that the shaft comprises two concentrically arranged shaft elements which can be moved relative to one another in an axial direction of the wheel body, and of which one supports the contact element and the other supports the suction cup element.

2. The transport wheel arrangement according to claim 1, comprising a plurality of receiving assemblies and the displacement device is designed to synchronously displace the contact elements and suction cup elements of two or more of the receiving assemblies.

3. The transport wheel arrangement according to claim 1, wherein the contact element comprises two limbs which, with respect to the shaft, extend obliquely radially outwards from the shaft.

4. The transport wheel arrangement according to claim 3, wherein the suction cup element is arranged between the two limbs of the contact element in the radial extension of the shaft.

5. The transport wheel arrangement according to any of the claim 1, wherein the at least one receiving assembly comprises at least one cam, which is guided in a slot associated with the wheel body.

6. The transport wheel arrangement according to claim 5, wherein the disc-shaped wheel body comprises two concentrically arranged disc elements which can be counter-rotated with respect to their common central axis.

7. The transport wheel arrangement according to claim 6, wherein a cam is associated with each of the contact element and the suction cup element, which cams are guided in separate slots in one of the two disc elements, the slots being designed such that counter-rotation of the two disc elements brings about a relative displacement of the contact element and the suction cup element in a radial direction.

8. The transport wheel arrangement according to claim 1, wherein the contact element and the suction cup element form a fixed assembly.

9. The transport wheel arrangement according to claim 1, wherein at least one switching means is associated with the main body, which switching means can be operated so as to interrupt a supply of the negative pressure to the suction cup element at a predetermined relative angle between the main body and the suction cup element or one of a plurality of suction cup elements.

10. The transport wheel arrangement according to claim 1, wherein the displacement device is designed to allow a radial displacement of the contact element relative to the wheel body by at least 20 mm.

11. The transport wheel arrangement according to claim 1, wherein the shaft is guided out of the disc-shaped wheel body in a sealed manner such that an interior of the wheel body is sealed with respect to a surrounding region.

12. The transport wheel arrangement according to claim 1, further c omprising a height adjustment device which is designed to displace the wheel body in a direction of a central axis of the wheel body.

13. Feeding arrangement for cylindrical bodies comprising:
   at least one first and one second transport wheel arrangement according to claim 1, which are arranged such that the cylindrical bodies can be transferred from the first transport wheel arrangement the second transport wheel arrangement at a transfer point;
   at least one input device, which is provided for transferring the cylindrical bodies to the first transport wheel arrangement at an input point; and
   at least one first and one second output device, which are each designed to receive the cylindrical bodies from the first or second transport wheel arrangement at an output point and to transport them away;
wherein the control units of the first and second transport wheel arrangements are coupled to one another during normal operation or are formed by a single common control unit, and wherein the feeding arrangement can be selectively operated such that the cylindrical bodies are received by the first or the second output device.

14. The transport wheel arrangement according to claim 1, wherein the control unit is further configured to control the negative-pressure source.

15. The transport wheel arrangement according to claim 6, wherein the two concentrically arranged disc elements can be counter-rotated with respect to their common central axis by the drive apparatus comprising drives for each of the two disc elements.

16. The transport wheel arrangement according to claim 15, wherein the drives comprise servomotors.

17. The transport wheel arrangement according to claim 10, wherein the displacement device is designed to allow a radial displacement of the contact element relative to the wheel body by at least 45 mm.

18. The transport wheel arrangement according to claim 11, wherein further sealing elements are provided.

* * * * *